(12) United States Patent
Dossas et al.

(10) Patent No.: US 6,896,222 B2
(45) Date of Patent: May 24, 2005

(54) HYDROGEN LIGHTER-THAN-AIR SHIP

(75) Inventors: Vasilios Dossas, Chicago, IL (US); Clifford H. Kraft, Naperville, IL (US)

(73) Assignee: ORO Grande Technology LLC, Naperville, IL (US)

( * ) Notice: Subject to any disclaimer, the term of this patent is extended or adjusted under 35 U.S.C. 154(b) by 11 days.

(21) Appl. No.: 10/361,898

(22) Filed: Feb. 6, 2003

(65) Prior Publication Data

US 2004/0155149 A1 Aug. 12, 2004

(51) Int. Cl.$^7$ .................................................. B64B 1/02
(52) U.S. Cl. ........................... 244/24; 244/30; 244/125
(58) Field of Search .............................. 244/24, 29, 30, 244/31, 33, 125, 128

(56) References Cited

U.S. PATENT DOCUMENTS

| | | | |
|---|---|---|---|
| 2,929,581 A | * | 3/1960 | Johnson, Jr. .................. 244/30 |
| 5,090,637 A | | 2/1992 | Haunschild .................. 244/97 |
| 5,348,254 A | | 9/1994 | Nakada ........................ 244/97 |
| 5,890,676 A | | 4/1999 | Coleman et al. ............. 244/128 |
| 5,958,214 A | * | 9/1999 | Nikolskaja .................. 205/784 |

OTHER PUBLICATIONS

Dirk Giggenbach, "Stratospäarishche Kommunikationsplattformen", NTZ, Nov., 2002 (Translation Not Provided of Entire Document But Only of Abstract, Overview and Figure Captions.

* cited by examiner

*Primary Examiner*—J. Woodrow Eldred
(74) *Attorney, Agent, or Firm*—Clifford Kraft; Vasilios Dossas

(57) ABSTRACT

A lighter-than-air ship using hydrogen or other gas as a lift gas with at least one hydrogen fuel cell aboard. The fuel cell can draw hydrogen fuel from the lift gas reservoir to produce electricity both for the ship's use and optionally for propulsion. The waste product of the fuel cell is water which can be used for the needs of a crew on the ship. The hydrogen lift gas chamber, which can be compartmentalized for lift control, can be surrounded by a safety jacket filled with an inert gas and contain optional hydrogen and/or oxygen sensors.

18 Claims, 4 Drawing Sheets

HYDROGEN LIGHTER-THAN-AIR SHIP

BACKGROUND

1. Field of the Invention

The present invention relates generally to the field of lighter-than-air ships and more particularly to a airship that uses hydrogen as a lift gas.

2. Description of the Prior Art

Hydrogen airships were in common use in the earlier part of this century and several made numerous transatlantic crossings. The hydrogen airship era ended with the explosion of the Hindenberg in New Jersey. For many years it was believed that the explosion was caused by the hydrogen gas used to lift the ship. Recent investigations have showed that this is much more unlikely than previously thought. In fact, photographs and accounts of the incident seem to indicate that it was the nitro compounds used to make the envelope that were actually burning (possibly later fueled by some of the hydrogen). In any case, it is almost certain that the explosion was ignited by either lightning or electrostatic discharge (ESD).

Airships using helium to lift rather than hydrogen have been used for various purposes since that era. While helium is non-combustive, it is also approximately four times heavier than hydrogen and considerably more expensive (because hydrogen can be made by a simple electrolysis of water). Helium ships such as the Goodyear Blimp and others are very well known and are used for advertising and observation. Helium balloons have been used for observation and communications at high altitudes and have also made trans-oceanic flights.

In the past airships have been at the fringes of aviation with airplanes taking a leading role. However, lately there has been talk about much more use of airships to provide stable observation and communications platforms. For example, scientists in Germany have shown that a fleet of 35 airships, each at an altitude of 25 km (15.5 miles or 82,000 feet) could provide complete communications coverage for the entire European continent for a very low cost personal communications network and for cellular telephone (a single airship costs orders of magnitude less than a communications satellite). These ships, because they operate at lower altitudes than satellites, provide a link power budget gain of over 40 decibels and a greatly reduced signalling delay. In addition, the airships can be brought down anytime for maintenance or upgrade. Satellites, once launched, can be neither upgraded nor repaired (See, e.g., Dirk Giggenbach, "Stratospheric Communication Platforms", NTZ Magazine of the VDE, November 2002, (published in German)).

Hydrogen offers tremendous advantages as an energy source over hydrocarbon fuels and as a lift gas over helium. As a fuel, hydrogen burns clean with the only bi-product being pure water. As a lift gas, it is 4 times lighter than helium. It can be produced from water by electrolysis with a bi-product of oxygen. In addition, if produced from sea water, bi-products also can include tremendous amounts of recovered metals, halogens, and mineral salts. While it is true that a hydrogen-oxygen mixture is explosive, so is an oxygen mixture of any fuel vapor including gasoline or jetfuel.

In the last few decades hydrogen fuel cells have been developed that produce considerable electric power from hydrogen gas or solid or liquid hydrides. In fact, hydrogen fuel cells running from tanks of hydrogen gas have been used in test buses in Chicago. In addition Honda Motors has just introduced its FCX model which is the first car on the U.S. market to run on hydrogen gas using proton-exchange membrane fuel cells and so-called porous ultracapacitors. The fuel cells used in the FCX produce 78 kW of power and give the vehicle a range of 350 km (217 miles—the vehicle also recaptures stopping energy from braking) (See, "Top Ten Tech Cars", IEEE Spectrum, February 2003, p. 32).

An airship that uses hydrogen as both a source of lift and a source of energy is badly needed in the art.

SUMMARY OF THE INVENTION

The present invention relates to a lighter-than-air ship with a hydrogen lift compartment where some hydrogen is also used for ship's power and propulsion. In a particular embodiment of the present invention, hydrogen gas from the hydrogen lift compartment can be used in a hydrogen fuel cell along with oxygen to generate electricity. In another embodiment, a conventional helium ship can be powered by a hydrogen fuel cell. The electricity from the fuel cell can be used both for ship's power and for propulsion. Alternatively, hydrogen could be directly used for propulsion in a direct hydrogen-powered engine. In various embodiments of the present invention, such airships can contain electronic equipment such as communications equipment and radar (in particular weather radar). In addition, an airship acting as a high-altitude observation platform could carry both optical and radio telescopes.

In an embodiment of the present invention, a safety jacket containing an inert gas can optionally surround the hydrogen (or main gas) compartment to provide a safety barrier between the hydrogen atmosphere on the inside of the compartment and the oxygen in the air outside the ship. This jacket can be filled with helium, nitrogen or other inert gas. It is preferred to place hydrogen and possibly oxygen sensors inside this jacket. These sensors can be monitored continuously to detect hydrogen leaks or enough penetrating hydrogen to cause a problem. In one embodiment of the present invention, this jacket can be purged with compressed inert gas to renew it if necessary.

For a fuel cell to work, oxygen must be available. At lower altitudes, enough oxygen from the outside air is available. At extremely high altitudes, this oxygen may have to be supplemented by tanked or generated oxygen to provide propulsion. High altitude ships are generally fairly stationary and do not need much propulsion.

A waste product of a hydrogen fuel cell is water. Excess water can simply be discharged into the atmosphere. In addition, it is possible for the fuel cell(s) to provide enough water for use by a crew on the airship. At high altitudes, special care must be taken to prevent freezing of any water discharge ports into the atmosphere since exterior temperatures are well below zero degrees C.

DESCRIPTION OF THE FIGURES

The following drawings and figures illustrate some embodiments and aspects of the present invention. The scope of the present invention is not limited to what is shown in the drawings.

DETAILED DESCRIPTION

Figure 1:
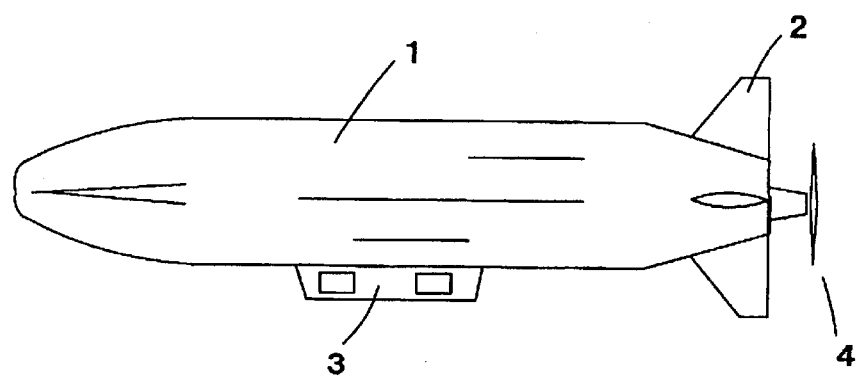
FIG. 1 is a side elevational view of a hydrogen airship.
Figure 2:
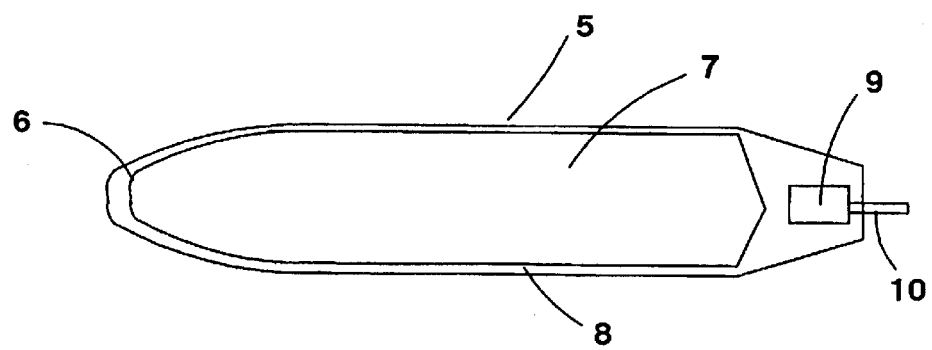
FIG. 2 is a sectional view taken longitudinally of the airship of FIG. 1 showing the gas chambers of the ship.

Turning now to the drawings, and referring specifically to FIGS. 1 and 2, the hydrogen airship of the present invention includes an outer gas envelope 1 covered with an outer skin that provides protection for the lift gas portion of the ship. Tail fins 2 provide aerodynamic stability and maneuverability while a pusher propeller 4 can provide pushing force. A cabin 3 is optional and can be located anywhere in, above or below the ship.

An inner section 7 can contain hydrogen gas, helium gas or a hydrogen/helium or a hydrogen/nitrogen mixture. The exact pressure of the gas depends on the structural strength of the assembly. It is desirable to put the hydrogen under some pressure so that extra hydrogen that will be used as fuel can be carried (extra over that needed for lift). It must be remembered that even if there is no over-pressure at ground level, at high altitudes about 1 atm. of over-pressure is to be expected (about 32 lbs/sq. ft.) as the ambient air becomes thinner. It is desirable, but not necessary, to over-pressure the hydrogen to reach a total volume of 2 or more times the physical volume (resulting in an over-pressure of about 2 atm. at high altitude). In this arrangement, there would be considerable extra hydrogen gas available as fuel while still having a lift gas weight at takeoff half that of a helium fill. The gas (before any fuel usage) would thus provide twice the lift of an equivalent volume of helium. Lift would increase as hydrogen fuel is depleted (lift decreases at higher altitudes with any airship because of the buoyancy principle and must be compensated for). While 2 times physical volume is a preferred starting volume, any volume or pressure for the lift gas is within the scope of the present invention.

Because of the change in buoyancy as hydrogen is consumed for fuel, the airship might become too light. To compensate for this, the main gas chamber can be constructed in a compartmentalized way with three or more separate compartments. In this way, hydrogen could be vented from the forward and aft compartments by blowing with nitrogen, or other heaver inert gas, as needed to increase weight. This technique would preserve aerodymanic stability while causing the airship to increase in weight. Since this blow would contain no oxygen, there would be no danger of an explosive mixture developing in the tank. The discharged hydrogen would eventually react with atmospheric oxygen to form water. The excess hydrogen, rather than simply being released could be burned in a fuel cell.

It is well known that hydrogen gas deeply penetrates most materials and therefore has a tendency to leak even out of steel containers. However, it is possible to provide a pressure hull 6 that could handle an over-pressure with only small hydrogen leakage. The pressure hull 6 should be light enough to produce a reasonable flying vehicle. Newer composite materials can be made that are light and strong, as well as dense enough to limit hydrogen penetration. It is also possible to use materials that can chemically or otherwise trap hydrogen into their structures to prevent further escape.

Even with the best pressure hull 6, some hydrogen gas will penetrate and escape. Therefore a second hull can optionally be used to surround the hydrogen compartment or container with a safety jacket 8 of inert gas. This inert gas can be helium or nitrogen or any other inert gas. Helium has about 4 times the weight of hydrogen, and nitrogen has about 14 times the weight of hydrogen. Thus helium is preferred to fill the safety jacket 8 for lightness. Nevertheless, the bulk of the weight in the lift system would be the pressure hull 6, and not the weight of the jacket gas, hence, the actual weight of the gas in the safety jacket is of secondary importance. Any inert gas can be used in the safety jacket 8 and is within the scope of the present invention. The safety jacket can have an outer protective layer 5 that would be either the skin of the airship or inside the skin of the airship. It is not necessary that the gas in the safety jacket be under pressure; however, it could be if necessary.

Figure 3:
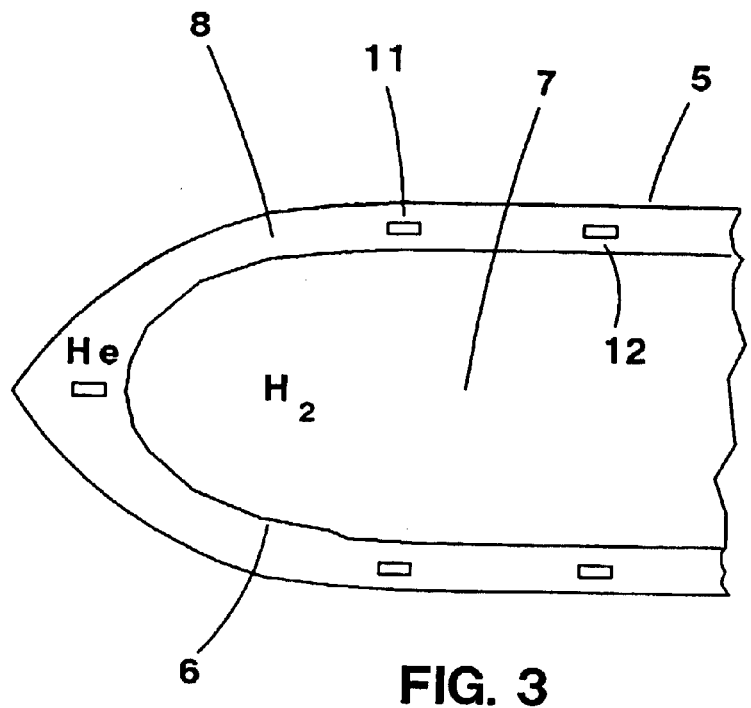
FIG. 3 is an enlarged section of FIG. 2 showing in detail a safe-gas jacket.

As shown in FIG. 3 helium normally fills the safety jacket 8; however, any inert gas can be used. The purpose of the safety jacket is to trap any hydrogen that has escaped from the pressure chamber 7. Since the safety jacket 8 is filled with inert gas, no explosive mixture is possible. The tiny amount of hydrogen that ultimately leaks out of the outer hull 5 is negligible when the safety jacket 8 is present. It should, of course, be remembered that a safety jacket is optional. A hydrogen lighter-than-air ship could be made with just a hydrogen compartment alone.

To make certain that no explosive mixture is possible, either hydrogen sensors 11, oxygen sensors 12, or both can be placed in the safety jacket space 8. These sensors can report directly to an onboard computer that continually computes the mixture parameters of the gases in the safety jacket 8. Any approach of quantities of hydrogen and oxygen toward an explosive mixture in the safety jacket 8 can be monitored and controlled. Control is possible by optionally flushing more helium or nitrogen (or other inert gas) into the safety jacket 8 from an on-board cylinder (or by simply bringing the craft down if too much hydrogen or oxygen is detected in the safety jacket). It should be noted that optional additional sensors can be placed inside the hydrogen pressure chamber 7. In particular, oxygen sensors are desirable here for additional safety. It is also envisioned that hydrogen pressure sensors could be placed in the hydrogen chamber to monitor pressure and hence hydrogen fuel quantity (as well as lift capability).

Figure 4:
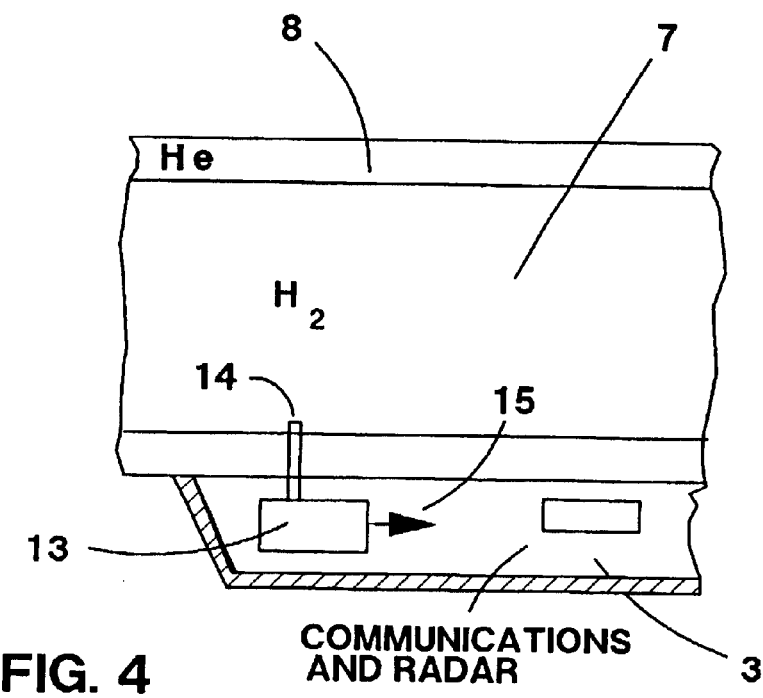
FIG. 4 is a partial sectional view of the airship of FIG. 1 showing a fuel cell that uses hydrogen from the lift tank as fuel to power the airship.

The cabin or compartment 3 supports one or more hydrogen fuel cells 13 that produce electric power that flows to the ship and possibly to the propulsion system by standard electrical conductors 15 as shown in FIG. 4. Of course the hydrogen fuel cell also needs oxygen to operate to produce water. Oxygen can be taken from the atmosphere at lower altitudes, and optionally from oxygen tanks or generators at higher altitudes. Oxygen generators generally use solid nitrates or chlorates to produce oxygen when heated. Even at higher altitudes, there is some oxygen present in the atmosphere. This can be optionally be collected using some expense of energy from a small turbo or other means running in tandem with the propulsion system.

In an alternate embodiment of the present invention, one or more hydrogen fuel cells could be located inside the hydrogen chamber. In this case oxygen would need to be vented inward. It is also possible to have a fuel cell straddle the hydrogen pressure hull with a hydrogen inlet on one side of the hull and an oxygen inlet and water outlet on the other side of the hydrogen hull.

Figure 5:
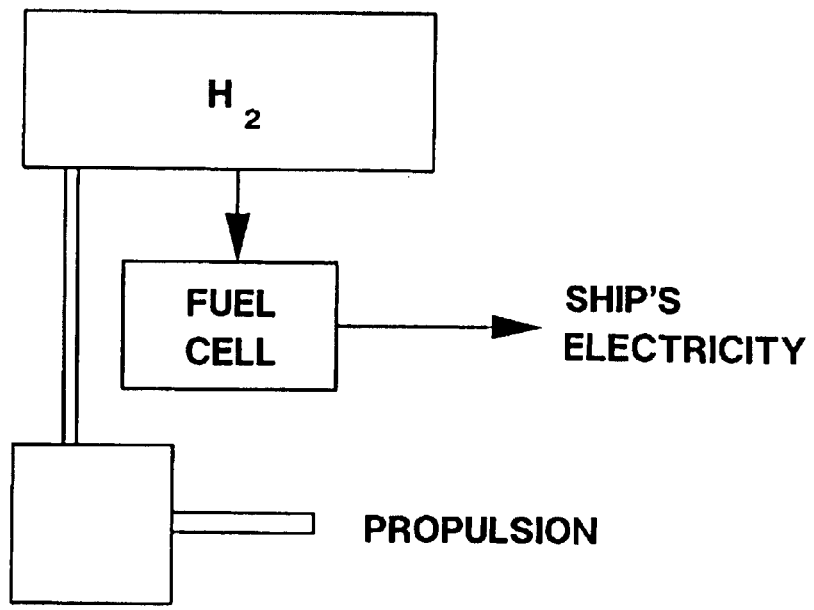
FIG. 5 is a schematic view of an electric propulsion embodiment of the present invention.
Figure 6:
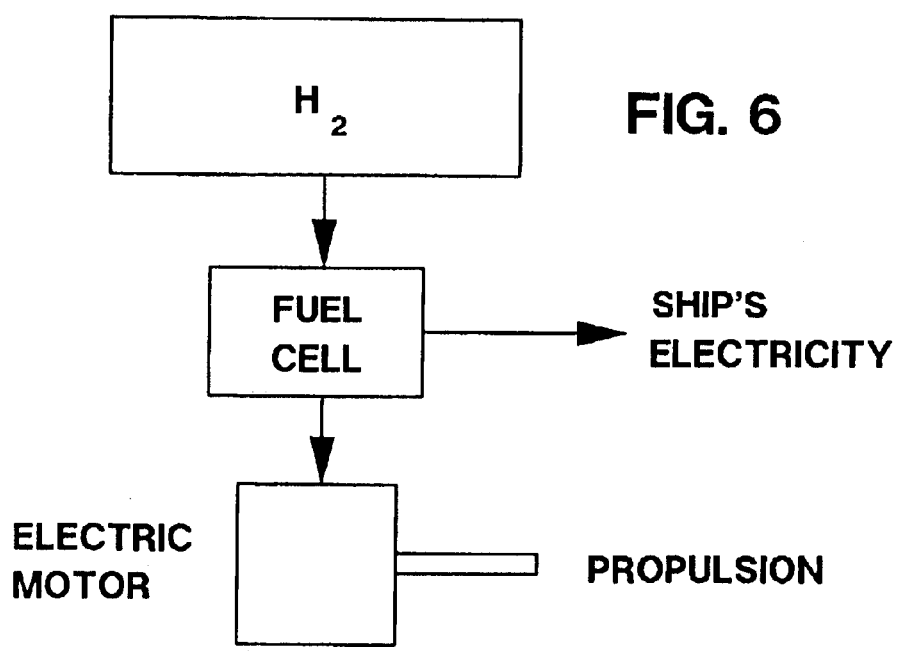
FIG. 6 is a schematic view of a direct hydrogen engine propulsion embodiment of the present invention.

In the rear of the airship behind the main gas lift chamber is a propulsion engine 9 and propeller shaft 10. The propulsion engine 9 can be electric in the form of an electric motor or a direct hydrogen-powered engine such as a hydrogen internal combustion engine. In one embodiment of the present invention, the ship's propulsion system includes a hydrogen fuel cell that produces electricity and drives an electric motor in a manner similar to the method used in fuel cell land vehicles (See FIGS. 5). In another embodiment of the present invention, a hydrogen engine is used (See FIG. 6). In today's technology, the electric motor technique shown in FIG. 5 is preferred because of weight and various technical problems associated with a direct hydrogen internal combustion engine. In both systems, a fuel cell can optionally produce ship's electric power.

In either propulsion system, there must be a source of oxygen as previously discussed. At lower altitudes, this is not a problem since sufficient oxygen can be taken from the atmosphere. At higher altitudes, where oxygen becomes scarce, propulsion becomes more of a problem. However, many applications of an airship do not require extensive propulsion at high altitudes (communications platforms for example). In these applications, the fuel cell(s) could be operated in a trickle mode using the available atmospheric oxygen along with sufficient hydrogen from the hydrogen chamber to charge a battery or capacitor with propulsion shut off. Then when propulsion was needed for maneuvering, the electric motor could be run from the battery or capacitor. Optional solar panels could provide additional energy.

Figure 7:
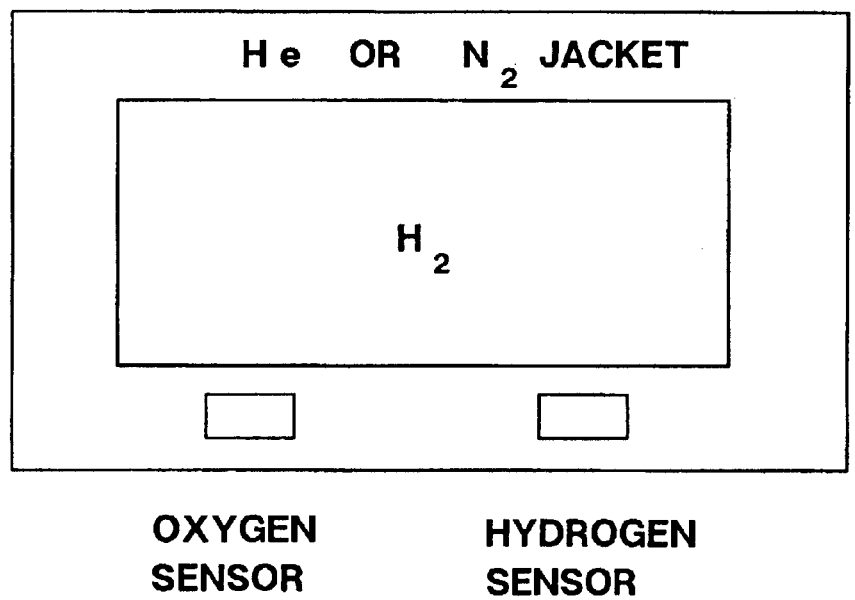
FIG. 7 is a schematic view of the relationship between the hydrogen lift gas, the safe-gas jacket and safety sensors.

The optional safety jacket normally surrounds the hydrogen storage chamber and traps any hydrogen that has penetrated the hydrogen pressure hull (see FIG. 7). The safety jacket can contain hydrogen and/or oxygen sensors to allow calculation of any approach to an explosive mixture. The function of the safety jacket is to prevent excess hydrogen from leaking into surrounding areas where there might be oxygen, and to prevent any ambient oxygen from somehow entering the hydrogen chamber. The safety jacket thus can present a closely monitored barrier region between the oxygen containing outer air and the hydrogen inside the hydrogen chamber. The only transport of gas across this barrier would be hydrogen taken out for fuel. The jacket barrier would preferably be continued out along any hydrogen fuel piping leaving the hydrogen barrier. The jacket could be continued up to the point where the hydrogen is actually combined with oxygen to produce energy. It should be appreciated as before stated, that a safety jacket is optional and is not necessary for the functioning of the present invention. However, for safety and positive control of any hydrogen leakage out or air leakage in, a safety jacket is highly recommended.

It is known that the waste product from any hydrogen combustion process (including a hydrogen fuel cell) is water. Water can simply be discharged into the atmosphere as a waste vapor. However, on a hydrogen airship such as that of the present invention, water could be optionally saved and used for the needs of a crew. At high altitudes, any water discharge port must be protected against freezing because the exterior air temperature is well below the freezing point of water at any pressure. This can be done by heaters or by circulating waste heat generated by the fuel cell or engines through the outlet port. Once the water is discharged, it will form micro ice droplets which will fall away from the ship.

It should be understood that the drawings and descriptions contained herein are merely descriptive of the present invention. One skilled in the art will readily recognize numerous changes and variations that do not depart from the spirit of the present invention and are within its scope.

I claim:

1. A lighter-than-air ship comprising:
   a first compartment containing hydrogen gas, said hydrogen gas providing lift for said ship;
   a second compartment containing an inert gas, said second compartment surrounding substantially all of said first compartment, whereby said second compartment forms a safety jacket for said first compartment;
   at least one gas sensor in said second compartment.

2. The lighter-than-air ship of claim 1 further comprising at least one oxygen sensor in said second compartment.

3. The lighter-than-air ship of claim 1 comprising at least one oxygen sensor in said first compartment.

4. The lighter-than-air ship of claim 1 further comprising an energy means for converting a portion of said hydrogen in said first compartment into energy.

5. The lighter-than-air ship of claim 4 wherein said means for converting a portion of said hydrogen into energy is a hydrogen fuel cell.

6. The lighter-than-air ship of claim 5 wherein electricity from said hydrogen fuel cell provides energy for propulsion of said ship.

7. The lighter-than-air ship of claim 5 wherein water from said hydrogen fuel cell is used as drinking water aboard said ship.

8. A lighter-than-air ship comprising:
   a first compartment containing hydrogen gas, said hydrogen gas providing lift for said ship;
   a hydrogen fuel cell coupled to said first compartment converting hydrogen gas from said first compartment into electricity;
   a second compartment containing an inert gas and surrounding substantially all of said first compartment.

9. The lighter-than-air ship of claim 8 further comprising an electric propulsion system connected to said hydrogen fuel cell using said electricity for propulsion.

10. The lighter-than-air ship of claim 9 wherein said electricity for propulsion drives and electric motor.

11. The lighter-than-air ship of claim 9 wherein said inert gas is helium.

12. The lighter-then-air ship of claim 9 wherein said inert gas is nitrogen.

13. A hydrogen airship comprising:
   a first storage means for storing hydrogen gas, said hydrogen gas providing lift for said airship;
   a fuel cell means for converting hydrogen gas to electricity using said hydrogen gas taken from said first storage means;
   an electric propulsion means for propelling said ship, said electric propulsion means powered by said electricity from said fuel cell means;
   a safety jacket means substantially surrounding all of said first storage means, said safety jacket means containing an inert gas.

14. The hydrogen airship of claim 13 further comprising at least one hydrogen sensor in said safety jacket means.

15. The hydrogen airship of claim 13 further comprising at least one oxygen sensor in said safety jacket means.

16. The hydrogen airship of claim 13 wherein said fuel cell means produces water as a waste product, a portion of said water being retained for crew usage.

17. The hydrogen airship of claim 13 further comprising a platform containing a communication system.

18. The hydrogen airship of claim 13 further comprising a platform containing a radar system.

* * * * *